United States Patent
Koste et al.

(10) Patent No.: US 9,488,786 B2
(45) Date of Patent: Nov. 8, 2016

(54) FIBER OPTIC SENSING APPARATUS INCLUDING FIBER GRATINGS AND METHOD FOR SENSING PARAMETERS INVOLVING DIFFERENT PARAMETER MODALITIES

(71) Applicant: General Electric Company, Schenectady, NY (US)

(72) Inventors: Glen Peter Koste, Niskayuna, NY (US); Raymond Verle Jensen, Gardnerville, NV (US); Hua Xia, Niskayuna, NY (US); Boon Kwee Lee, Niskayuna, NY (US); Victor Petrovich Ostroverkhov, Ballston Lake, NY (US); Sachin Narahari Dekate, Niskayuna, NY (US); William Albert Challener, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 17 days.

(21) Appl. No.: 13/678,979

(22) Filed: Nov. 16, 2012

(65) Prior Publication Data

US 2014/0139841 A1 May 22, 2014

(51) Int. Cl.
*G01B 9/02* (2006.01)
*G02B 6/34* (2006.01)
*G01D 5/353* (2006.01)

(52) U.S. Cl.
CPC . *G02B 6/34* (2013.01); *G01B 9/02* (2013.01); *G01D 5/3539* (2013.01); *G01D 5/35316* (2013.01); *G01D 5/35358* (2013.01)

(58) Field of Classification Search
CPC ....................................................... G02B 6/34
USPC .......................................................... 356/478
See application file for complete search history.

(56) References Cited

U.S. PATENT DOCUMENTS 5,194,847 A 3/1993 Taylor
5,355,208 A 10/1994 Crawford et al.
(Continued)

FOREIGN PATENT DOCUMENTS

AU 2010308572 A1 4/2012
DE 102006015159 A1 10/2007
(Continued)

OTHER PUBLICATIONS

Shatalin et al., "Interferometric Optical Time-Domain Reflectometry for Distributed Optical-Fiber Senesing," Applied Optics, pp. 5600-5604, vol. 37, Issue 24, 1998.
(Continued)

*Primary Examiner* — Tarifur Chowdhury
*Assistant Examiner* — Omar Nixon
(74) *Attorney, Agent, or Firm* — Joseph J. Christian (57) ABSTRACT

Optical-based apparatus and method for sensing parameters in connection with an asset, such as a pipeline, are provided. At least two sites in an optical fiber may include a respective fiber grating arranged to have a respective optical response in a wavelength spectrum having a distinguishing feature indicative of a value of a respective local parameter at a respective grating site. The two fiber gratings may be further arranged to form, in combination with a respective portion of the optical fiber which extends between the two sites, respective optical backscatter portions that when combined with one another are effective to sense an optical change in the fiber portion between the sites indicative of a value of a distributed parameter. This is a parameter modality different from a parameter modality of the respective local parameters at the respective grating sites.

25 Claims, 4 Drawing Sheets

(56) References Cited

U.S. PATENT DOCUMENTS

| | | |
|---|---|---|
| 5,680,489 A | 10/1997 | Kersey |
| 5,698,848 A | 12/1997 | Belk |
| 5,754,293 A | 5/1998 | Farhadiroushan |
| 5,757,487 A | 5/1998 | Kersey |
| 5,848,204 A | 12/1998 | Wanser |
| 5,867,258 A | 2/1999 | Frederick et al. |
| 5,987,197 A | 11/1999 | Kersey |
| 6,195,162 B1 | 2/2001 | Varnham et al. |
| 6,285,806 B1 | 9/2001 | Kersey et al. |
| 6,305,227 B1 | 10/2001 | Wu et al. |
| 7,142,736 B2 | 11/2006 | Patel et al. |
| 7,199,869 B2 | 4/2007 | MacDougall |
| 7,336,862 B1 | 2/2008 | Xai et al. |
| 2002/0025097 A1 | 2/2002 | Cooper et al. |
| 2002/0041722 A1 | 4/2002 | Johnson et al. |
| 2007/0280605 A1 | 12/2007 | Mendoza |
| 2010/0074572 A1 | 3/2010 | Zheng et al. |
| 2010/0085572 A1* | 4/2010 | Hartog .......................... 356/478 |
| 2010/0086251 A1* | 4/2010 | Xu ........................ G02F 1/3513 385/1 |
| 2010/0128348 A1* | 5/2010 | Taverner ....................... 359/572 |
| 2010/0134783 A1 | 6/2010 | Omichi et al. |
| 2010/0140462 A1* | 6/2010 | Farrell et al. ............ 250/227.14 |
| 2010/0200744 A1 | 8/2010 | Pearce et al. |
| 2011/0149293 A1 | 6/2011 | Dorner |
| 2011/0170823 A1* | 7/2011 | Xia et al. ........................ 385/12 |
| 2012/0179378 A1 | 7/2012 | Duncan et al. |
| 2012/0179390 A1 | 7/2012 | Kimmiau et al. |

FOREIGN PATENT DOCUMENTS

| | | |
|---|---|---|
| EP | 1110065 B1 | 6/2001 |
| EP | 2053364 A1 | 4/2009 |
| EP | 2128571 A1 | 12/2009 |

OTHER PUBLICATIONS

Shatalin et al., "Interferornetric Optical Time-Domain Reflectometry for Distributed Optical-Fiber Sensing," Applied Optics, pp. 5600-5604, vol. 37, Issue 24,1998.

Juarez., "Distributed Fiber Optic Intrusion Sensor System for Monitoring Long Perimeters", PhD dissertation, Texas A&M University, pp. 1-84, Aug. 2005.

PCT Search Report and Written Opinion issued May 28, 2014 in connection with corresponding PCT Patent Application No. PCT/US2013/063608.

* cited by examiner

FIBER OPTIC SENSING APPARATUS INCLUDING FIBER GRATINGS AND METHOD FOR SENSING PARAMETERS INVOLVING DIFFERENT PARAMETER MODALITIES

FIELD OF THE INVENTION

Aspects of the present invention relate generally to fiber optics sensing, and, more particularly, to a sensing apparatus and method based on fiber optics and fiber gratings, which may be adapted to sense multiple parameters, as may involve different parameter modalities.

BACKGROUND OF THE INVENTION

Certain types of industrial assets, such as may be used for the transportation of a commodity through a pipeline, may extend over relatively long distances (e.g., hundreds of kilometers or more). For example, since the asset may be subject to variable physical conditions (e.g., temperature, mechanical stress, pressure) or may develop malfunctions (e.g., ruptures) anywhere along its length, it is desirable to provide the ability to reliably and cost-effectively monitor/sense various parameters along the length of the asset. Other industrial assets which may require monitoring of variable physical conditions may be deployed at multiple sites over a relatively large geographical area, such as wind energy farms, solar farms, etc.

Certain optical sensing systems have attempted to measure various parameters at multiple locations. However, such sensing systems generally involve costly and burdensome hardware, such as may entail a number of optical fibers and concomitant connectors as well as different types of sensors to sense the parameters of interest. It is believed that no optical sensing system has been developed which in a cost effective manner and in an integrated fashion is able to monitor multiple parameters, which may involve different parameter modalities.

BRIEF DESCRIPTION OF THE INVENTION

Generally, aspects of the present invention in one example embodiment may provide an apparatus including an optical fiber. At least two sites in the fiber may comprise a respective fiber grating arranged to have a respective optical response in a wavelength spectrum comprising a distinguishing feature indicative of a value of a respective local parameter at a respective grating site. The two fiber gratings may be further arranged to form, in combination with a respective portion of the optical fiber which extends between said at least two sites, respective optical backscatter portions that when combined with one another are effective to sense an optical change in the fiber portion between the sites indicative of a value of a distributed parameter. This may be a parameter modality different from a parameter modality of the respective local parameters at the respective grating sites.

Further aspects of the present invention, in another example embodiment may provide an optical-based method for sensing parameters. The method includes providing an optical fiber. The method further includes arranging at least two sites in the fiber comprising a respective fiber grating arranged to have a respective optical response in a wavelength spectrum comprising a distinguishing feature indicative of a value of a respective local parameter at a respective grating site; and configuring the two fiber gratings to form, in combination with a respective portion of the optical fiber which extends between said at least two sites, respective optical backscatter portions that when combined with one another are effective to sense an optical change in the fiber portion between the sites indicative of a value of a distributed parameter. This may be a parameter modality different from a parameter modality of the respective local parameters at the respective grating sites.

BRIEF DESCRIPTION OF THE DRAWINGS

The invention is explained in the following description in view of the drawings that show.

DETAILED DESCRIPTION OF THE INVENTION

In the following detailed description, numerous specific details are set forth in order to provide a thorough understanding of various embodiments of the present invention. However, those skilled in the art will understand that embodiments of the present invention may be practiced without these specific details, that the present invention is not limited to the depicted embodiments, and that the present invention may be practiced in a variety of alternative embodiments. In other instances, to avoid pedantic and unnecessary description well known methods, procedures, and components have not been described in detail.

Furthermore, various operations may be described as multiple discrete steps performed in a manner that is helpful for understanding embodiments of the present invention. However, the order of description should not be construed as to imply that these operations need be performed in the order they are presented, nor that they are even order dependent. Moreover, repeated usage of the phrase "in one embodiment" does not necessarily refer to the same embodiment, although it may. Lastly, the terms "comprising", "including", "having", and the like, as used in the present application, are intended to be synonymous unless otherwise indicated.

Figures 1, 2:
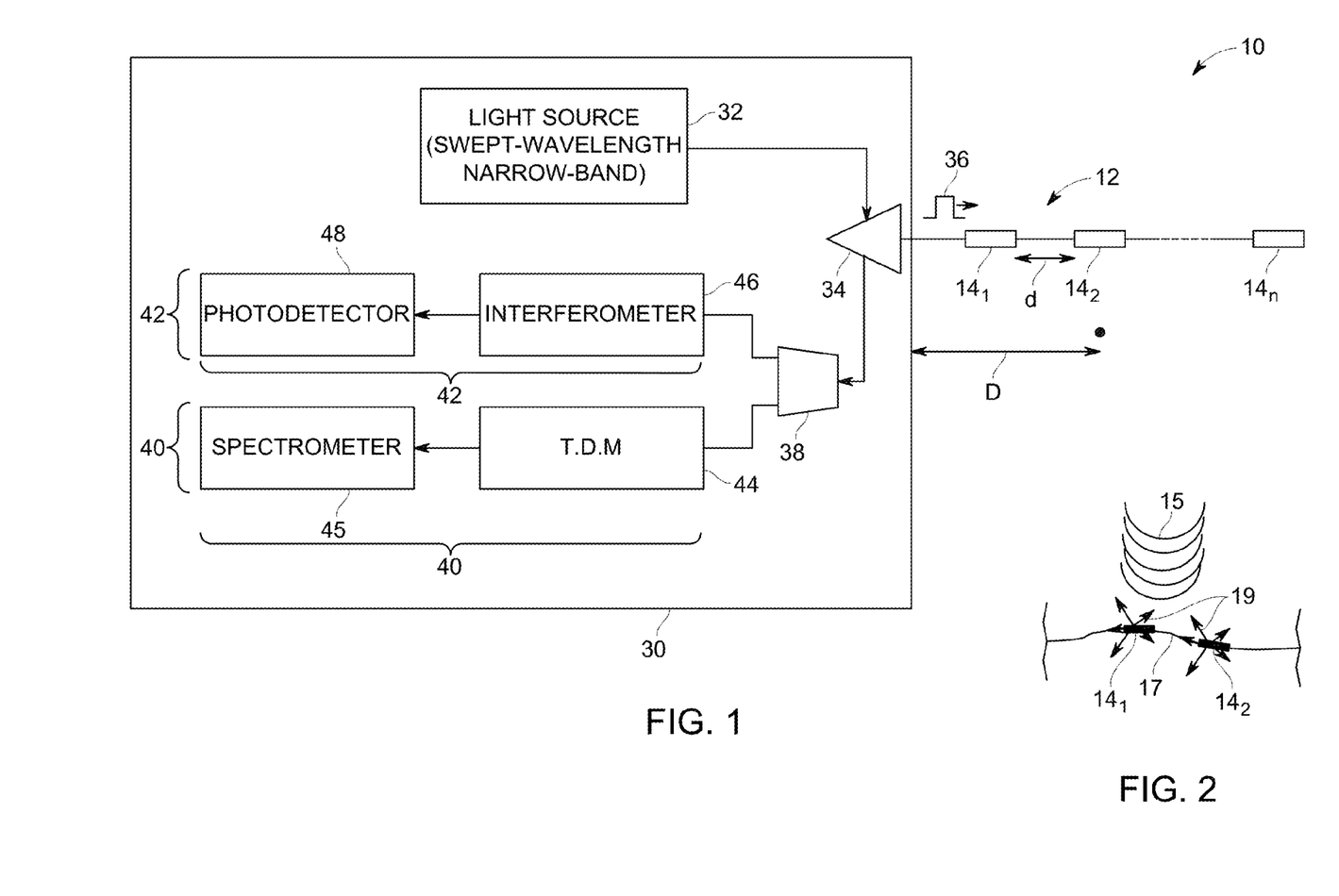
FIG. 1 is a schematic representation of one example embodiment of an optical sensing apparatus depicting an optical fiber embodying aspects of the present invention and one example embodiment of an optical interrogator.
FIG. 2 is a simplified conceptual schematic illustrating certain sensing features of an optical sensing apparatus embodying aspects of the present invention, which may allow sensing distributed parameters.
Figure 3:
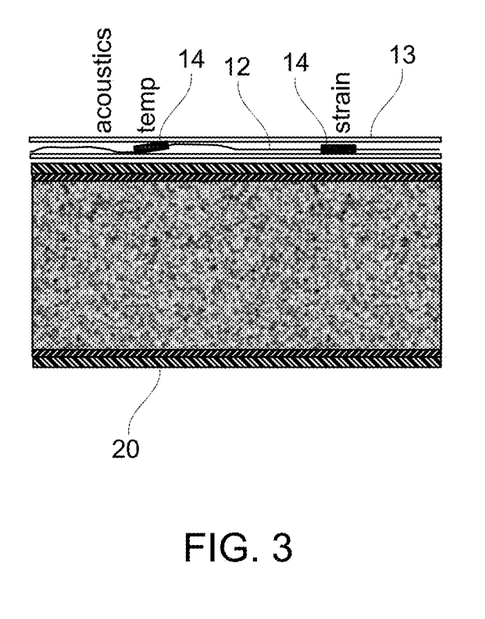
FIG. 3 is a schematic representation of an optical fiber embodying aspects of the present invention, as may be affixed onto an example asset (e.g., a pipeline) for monitoring parameters of interest in connection with the asset.

FIG. 1 shows a schematic representation of one example embodiment of an optical-based sensing apparatus 10 embodying aspects of the present invention. Apparatus 10 includes an optical fiber 12, which may be housed in a jacket 13 (FIG. 3), and which may be affixed onto an asset 20 (FIG. 3) for monitoring parameters of interest in connection with the asset. One example of an asset 20 may be a pipeline. It will be appreciated, however, that a broad range of categories of assets in a variety of diverse applications may benefit from aspects of the present invention, such as assets in the realm of civil engineering (e.g., building structures, bridge structures, tunnel structures, water control structures, etc.); assets in the realm of energy production (e.g., wind energy farms, solar power farms, nuclear power plants; assets in the realm of transportation (air and marine vessels, trains, etc.); assets in the realm of intrusion sensing. The foregoing should be construed in an example sense and not in a limiting sense being that any application which may involve monitoring of parameters over many locations may benefit from aspects of the present invention.

In one example embodiment, optical fiber 12 may include at least two sites having a respective fiber grating ($14_1$, $14_2$ ... $14_n$), such as a fiber Bragg grating (FBG), as may be arranged to have a respective optical response in a wavelength spectrum with a distinguishing feature, which, for example, may be indicative of a value of a respective local parameter at a respective grating site. Examples of local parameters which could be measured at the grating site due to local effects—depending on how the grating site is packaged—may include strain, temperature, acceleration, pressure, chemistry. For example, bonding the grating to the cable jacket and structure would enable the measurement of strain. Conversely, loosely routing the grating in the cable without bonding would enable the measurement of temperature. Additional packages can be manufactured by those skilled in the art to transfer the effects of acceleration, pressure, and chemistry into strain for measuring these parameters locally at the grating site.

The two fiber gratings, e.g., $14_1$, $14_2$, may be further arranged to form, in combination with a respective portion of the optical fiber which extends between the grating sites, respective optical backscatter portions that when combined with one another are effective to sense an optical change in the fiber portion between the sites, which may indicate a value of a distributed parameter, such as dynamic strain, dynamic pressure, an acoustic signal, etc. It will be appreciated that this is a parameter modality (e.g., distributed over the fiber portion between the sites and which could involve up to tens of KHz variation) different from the parameter modality of the respective local parameters sensed at the respective grating sites, which may involve relatively slowly varying parameters. As used herein, a local parameter refers to a parameter for measurement of a local effect at the grating site; and a distributed parameter refers to a parameter for measurement of an effect in the fiber portion between the sites.

In one example embodiment, the fiber gratings may be adapted to induce a relatively higher backreflection, (e.g., inducing enhanced reflectivity at off-Bragg wavelengths) and this may be effective for sensing of dynamic parameters, (e.g., acoustic sensing). Example techniques to induce the relatively higher backreflection may be as follows:

Write a narrow-band grating response (e.g., standard peaked response, (in one example embodiment approximately ≤1 nm)) and a chirped grating response (e.g., broadened spectral response) at a given grating site. (See Tables 1 and 2, which respectively list example steps, as may be implemented in two example embodiments involving a phase masking technique)

Write a standard grating response, apply a structure that appropriately stresses the fiber over a length to increase backscatter: one example may be a splice protector with a corrugated strength member; another example may be recoating with a suitable coating (e.g., metal coating, etc) to achieve the increased backscatter

TABLE 1

| Eg. 1 | Example Steps For Jointly Combining Narrow-band (e.g., Peaked) Response with Broad-band (e.g., Chirped) Response At a Given Grating Site |
|---|---|
| i | Stripping coating from fiber |
| ii | Illuminating core with UV pattern with a first mask configured for narrow-band response |
| iii | Illuminating core with UV pattern through a second mask arranged to provide the broad-band response |
| iv | Recoating the fiber |

TABLE 2

| Eg. 2 | Example Steps For Jointly Combining Narrow-band (e.g., Peaked) Response with broad-band (e.g., Chirped) Response At a Given Grating Site |
|---|---|
| i | Stripping coating from fiber |
| ii | Illuminating core with UV pattern with a mask encompassing both narrow-band response and broad-band response |
| iii | Recoating the fiber |

FIG. 2 is a simplified schematic to visually appreciate the foregoing concepts. For example, wavefronts 15 may represent an example of a dynamic stimulus (e.g., an acoustic signal) impinging on fiber gratings $14_1$, $14_2$ and the fiber portion 17 located between fiber gratings $14_1$, $14_2$. In this schematic, arrows 19 represent respective optical backscatter portions that when combined may be effective to sense an optical change in the fiber portion between the grating sites, and the sensed optical change may, for example, be processed to indicate the value of the dynamic distributed parameter.

Figure 4:
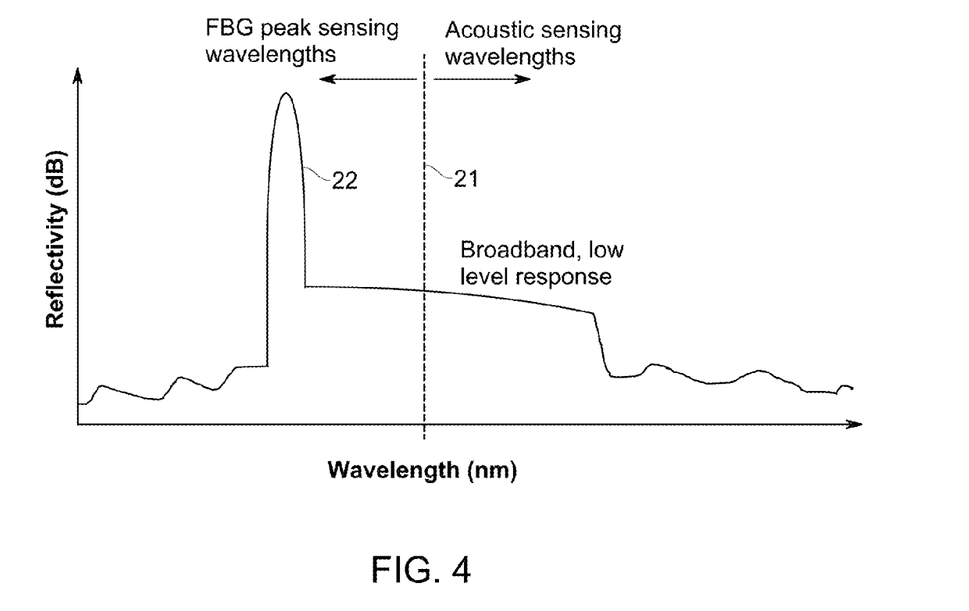
FIGS. 4 and 5 are plots representing example optical responses, such as may indicate reflectivity of light as a function of wavelength in connection with an example fiber grating site.
Figure 5:
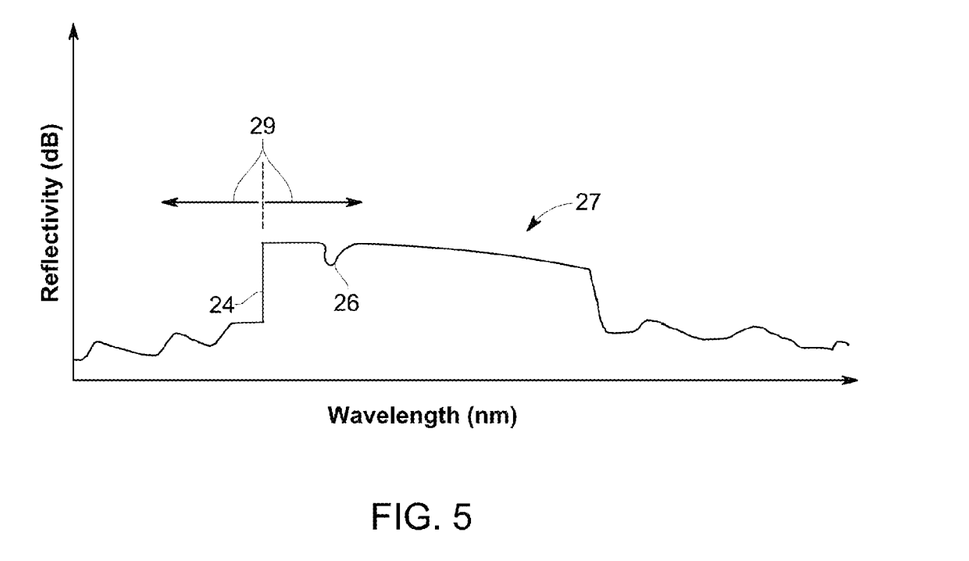

FIGS. 4 and 5 are plots representing example optical responses, such as may indicate reflectivity of light as a function of wavelength in connection with an example grating site. A desired optical response may be appropriately engineered in the fiber gratings embodying aspects of the present invention to effectively sense with the same optical hardware different parameter modalities. By way of example, a fiber grating could be engineered so that its optical response in a first wavelength range (e.g., conceptually represented by wavelengths to the left of line 21 in FIG. 4) provides the distinguishing feature (e.g., a lobe 22), which may be processed to indicate the value of a respective local parameter at the respective grating site (e.g., sensing of slowly varying parameters). The same fiber grating could also be engineered to exhibit a relatively broad, low-level response (e.g., as may be effected by a broad-band chirped fiber Bragg grating) in a second wavelength range (e.g., conceptually represented by wavelengths to the right of dashed line 21) effective to form the respective optical backscatter portions that when combined may be effective to sense an optical change in the fiber portion between the sites (e.g., dynamic distributed sensing). It will be appreciated that the distinguishing feature in the wavelength spectrum need not be a lobe since other distinguishing features could be engineered in a given fiber grating, such as a band edge 24, a notch 26, a pattern 27, as may conceptually illustrated in FIG. 5. For example, spectral shifts (conceptually represented by arrows 29) of edge 24 may be tracked by way of suitable signal processing to determine changes in the value of a parameter at a given grating site.

Returning to FIG. 1, apparatus 10 may further include an optical interrogator 30 including an optical source 32. In one example embodiment, optical source 32 may comprise a narrow-band swept-wavelength light source, such as where the optical frequency of the light source may be swept over a wavelength range sufficiently wide to, for example stimulate an appropriate optical response, as discussed in the examples of FIGS. 4 and 5. In one example case, presuming low-reflectivity FBGs with lobes are used (e.g., example Bragg response from approximately 1530 nm to approximately 1545 nm), then one example wavelength range for light source 32 may be from approximately 1530 nm to approximately 1560 nm. In this example, line 21 (FIG. 4) would be disposed approximately at 1545 nm. It will be appreciated that aspects of the present invention are not limited to any particular type of FBGs and/or wavelength range. Thus the foregoing description is just and example and should not be construed in a limiting sense.

Optical source 32 may be optically coupled through a circulator 34 to one end of fiber 12 to apply at least one optical pulse, (conceptually represented by a pulse 36) which when reflected at a respective grating site conveys the feature, which may be indicative of the value of the respective local parameter at the respective grating site, and which when passing through the respective fiber portion which extends between the two grating sites, conveys the respective optical backscatter portions. In one example embodiment, light source 32 may be triggered on (e.g., to transmit a pulse of light) at a trigger time ($t_{on}$) and may be triggered off at time $t_{off}=t_{on}+2$ dn/c, where d represents the distance between gratings, n represents the index of refraction of the fiber and c represents the speed of light. The idea being that the width of the pulse of light is not so wide as to simultaneously encompass two adjacent grating sites for measuring the distinguising features at the grating sites.

In one example embodiment, optical source 32 may be controlled to function in two modes: a first mode where the optical frequency of the light source is swept over a first wavelength range to measure the distinguishing features at the grating sites; and a second mode where it is tuned to a second wavelength range to measure the response in the fiber between the respective gratings sites.

In one example embodiment, optical interrogator 30 may include a wavelength demultiplexer 38, as may provide a first detection channel 40 (e.g., to process the wavelengths to the left of line 21 in FIG. 4) configured to monitor the feature indicative of the value of a respective local parameter at a respective grating site, and may further provide a second detection channel 42 (e.g., to process the wavelengths to the right of line 21) configured to combine the optical backscatter portions to sense the optical change in the respective fiber portion (e.g., fiber portion 17) which extends between two grating sites (e.g., grating sites $14_1$, $14_2$) indicative of the value of a distributed parameter. It will be appreciated that the respective optical backscatter portions comprise wavelengths which at least partially overlap. In one example embodiment, second detection channel 42 may include an interferometer 46 (e.g., unbalanced interferometer) arranged to combine the optical backscatter portions, and a photodetector 48 (e.g., photodiode) coupled to receive the combined optical backscatter portions from interferometer 46.

In one example embodiment, first detection channel 40 may include a time division modulator 44 (labeled T.D.M.) arranged to relate a respective reflected pulse to a respective grating site. In one example embodiment, modulator 44 may be conceptualized as a shutter, which is open at time $t_{open}=t_{on}+2$ Dn/c, and which is closed at time $t_{closed}=t_{on}+2$ (D+d)n/c, where D represents a distance to the grating site being interrogated, (e.g., grating site $14_2$). First detection channel 40 may further include an spectrometer 45, as may be arranged to detect changes in the feature indicative of the value of a respective local parameter at a respective grating site. It will be appreciated by one skilled in the art that the functionality provided by demodulator 44 may be optionally implemented by way of spectrometer 45. For example, spectrometer 45 could include a temporal gating functionality to process the light pulses from a desired fiber grating site.

It will be appreciated by those skilled in the art that spectrometer 45 can be implemented in a variety of ways, such as by way of dispersive optics to distribute the light by wavelength onto a photodiode array; or by way of a tunable filter, as may allow predefined wavelengths to illuminate a photodiode at different times. It is also feasible to integrate the two detection channels into a single detection channel. For example, one or more photodiodes may be arranged in spectrometer 45 to combine the optical backscatter portions used to measure the dynamic distributed parameter while using further photodiodes or filter settings in the spectrometer to measure the local parameter of the grating at the grating site. This example embodiment would eliminate in FIG. 1 the following elements: wavelength demultiplexer 38, interferometer 46, and photodetector 48. This example would eliminate a separate second detection channel, as illustrated in FIG. 1

Figures 6, 7:
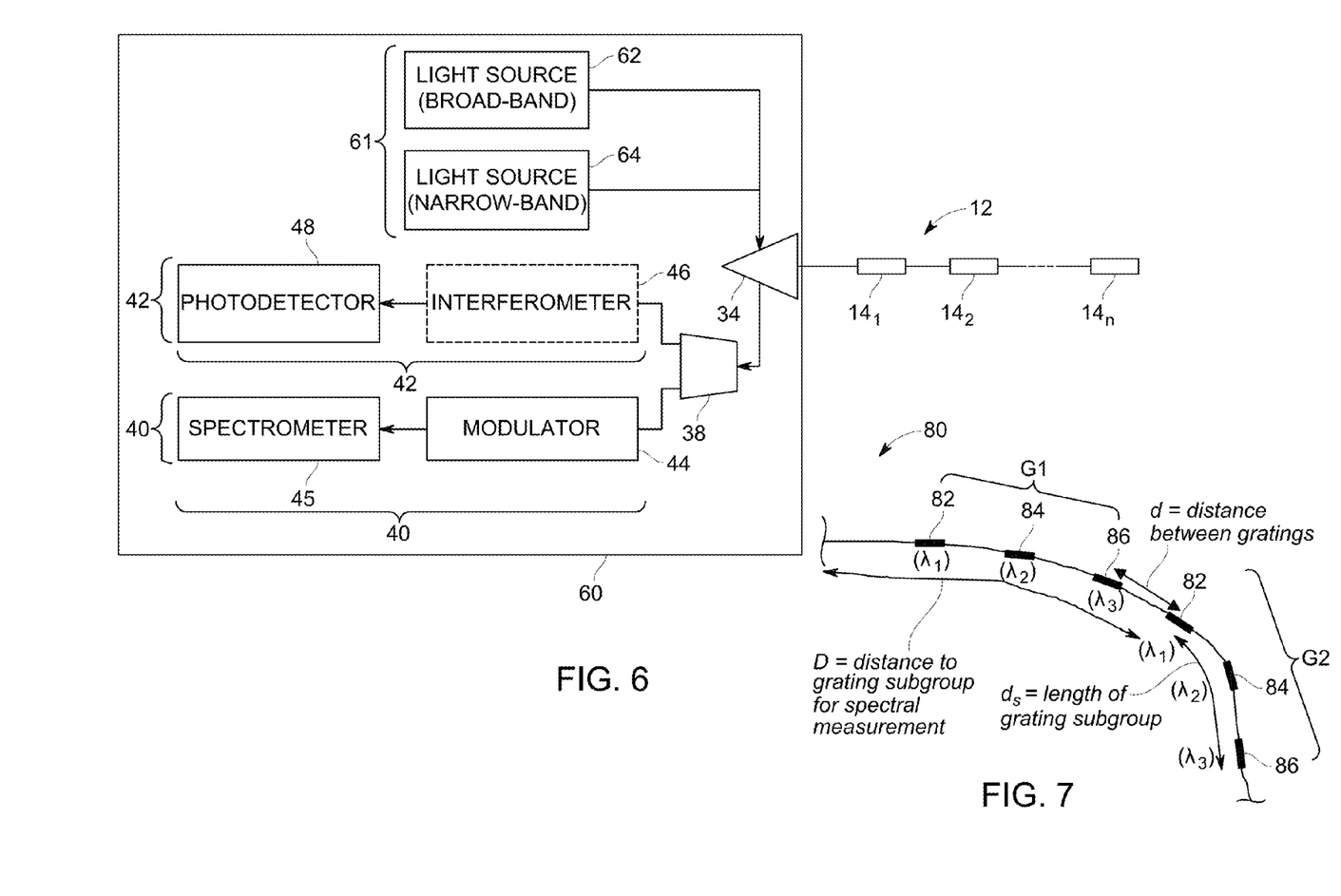
FIG. 6 is a schematic of another example embodiment of an optical interrogator.
FIG. 7 is a schematic of an example embodiment of an optical fiber including groupings of fiber gratings, as may be arranged along the length of the fiber.

FIG. 6 is a schematic of an example embodiment of an optical interrogator 60 where an optical source 61 is made up of a source 62 of broad-band light over a first wavelength range, and further includes a source 64 of narrow-band light over a second wavelength range. In one example embodiment, the second wavelength range may have longer wavelengths relative to the first wavelength range. For example, the first wavelength range provided by the broad-band light source 62 may correspond to wavelengths to the left of line 21 in FIG. 4 while the second wavelength range provided by narrow-band light source 64 may correspond to wavelengths to the right of dashed line 21. It will be appreciated that narrow-band light source 64 is conducive to pulse self-interference on the photodetector (e.g., conducive to sensing of dynamic parameters) and thus this example embodiment may provide the flexibility to optionally eliminate interferometer 46 (this optionally is schematically represented by the dashed line for the block diagram which represents interferometer 46) in the second interrogator channel 42.

In accordance with further aspects of the present invention, FIG. 7 is a schematic of a fiber 80 including a plurality of fiber gratings (82, 84, 86) distributed along a length of the fiber in respective groups, such as example groups labeled G1 and G2. In one example embodiment, the fiber gratings which constitute a respective group may have respective non-overlapping wavelength optical responses relative to one another. For example, fiber gratings 82 may exhibit their respective distinguishing features over a first wavelength range (e.g., λ1), fiber gratings 84 may exhibit their distinguishing features over a second wavelength range (e.g., λ2) and fiber gratings 86 may exhibit their distinguishing features over a third wavelength range (e.g., λ3). This grouping arrangement may provide the following example advantages. For example, in an arrangement where the fiber includes a total of 100 gratings having their optical responses essentially over a common wavelength range (λc), then light in such an arrangement would be attenuated 100 times the attenuation of one grating over the common wavelength range. Compare the foregoing example with another example arrangement where the fiber also includes 100 gratings but in this case their optical responses are distributed over three different non-overlapping wavelength ranges (e.g., λ1, λ2, λ3), then light in such an arrangement in each wavelength range would be attenuated $\frac{1}{3}^{rd}$ lower when compared to the light attenuation of the foregoing example. Additionally, such non-overlapping optical responses from a respective group may be simultaneously processed in the time domain to concurrently extract the respective distinguishing features indicative of respective values of one or more respective local parameters at the respective grating sites. For example, presuming the distance to a given fiber grating group (e.g., group G2) is distance D, further presuming the distance of the fiber group is distance $d_s$ (e.g., intragroup distance), then the modulator which provides a shutter functionality may be configured to open at time $t_{open} = t_{on} + 2$ Dn/c, and to close at time $t_{closed} = t_{on} + 2$ (D+$d_s$)n/c. The idea being that the optical responses of the constituent fiber gratings (e.g, fiber gratings 82, 84, 86) of a respective group being interrogated (e.g., group G2) could be simultaneously processed to contemporaneously obtain the sensing information from the constituent grating sites of the group being interrogated.

In operation, aspects of the present invention allow cost-effective and reliable monitoring of assets, which may involve relatively long-distances and/or large geographical areas. One example may be a pipeline, which may be subject to varying levels of stress or may develop leaks. For example, to monitor the pipeline for excessive stress, measurement of strain along the pipe may be desirable; whereas to monitor leaks, acoustic and temperature measurements would be more suitable. In operation, an apparatus comprising a single fiber and a common optical interrogator may allow cost-effective and reliable monitoring of parameters, which may comprise different parameter modalities, such as relatively slowly-varying parameters as well as relatively rapidly-changing parameters. It will be appreciated that this versatility to measure different modalities of measurands leads to an integrated determination about the health of the asset, such as substantially reducing the probability of false positives or negatives.

While various embodiments of the present invention have been shown and described herein, it is noted that such embodiments are provided by way of example only. Numerous variations, changes and substitutions may be made without departing from the invention herein. Accordingly, it is intended that the invention be limited only by the spirit and scope of the appended claims.

The invention claimed is:

1. An apparatus comprising:
 an optical fiber comprising:
  at least two grating sites in the optical fiber comprising respective fiber gratings arranged to have respective optical responses in a first wavelength range comprising a distinguishing feature, wherein the distinguishing feature is indicative of a value of a respective local parameter at a respective grating site;
  wherein the fiber gratings are further arranged to form, in combination with a respective portion of the optical fiber which extends between said at least two grating sites, respective optical backscatter portions that when combined with one another define another distinguishing feature in the optical response in a second wavelength range that is effective to sense an optical change in the fiber portion between the sites indicative of a value of a distributed parameter, wherein the distributed parameter comprises a parameter modality different from a parameter modality of respective local parameters at the respective grating sites, and wherein the optical responses from one or more grating sites of the at least two grating sites and optical responses from the respective optical backscatter portions of the one or more grating sites are simultaneously processed to contemporaneously obtain sensing information representative of the local parameters and distributed parameters;
 an optical interrogator operatively coupled to the optical fiber, the optical interrogator comprising:
  a first detection channel configured to monitor the distinguishing feature indicative of the value of the respective local parameter at the respective grating site, wherein the first detection channel comprises:
   a time division modulator arranged to relate one or more respective reflected pulses to one or more respective grating sites;
   a spectrometer arranged to detect changes in the feature indicative of the value of a respective local parameter at a respective grating site; and
  a second detection channel configured to combine the respective optical backscatter portions to sense the optical change in the respective fiber portion which extends between the two grating sites, wherein the optical change is indicative of the value of the distributed parameter.

2. The apparatus of claim 1, wherein the distinguishing feature in the first wavelength range comprises a feature selected from the group consisting of a band edge, a lobe, a notch, a pattern.

3. The apparatus of claim 1, wherein the respective local parameter at the respective grating site comprises a parameter selected from the group consisting of strain, temperature, and pressure.

4. The apparatus of claim 1, wherein the respective distributed parameter comprises a parameter selected from the group consisting of dynamic strain, dynamic pressure and an acoustic signal.

5. The apparatus of claim 1, wherein the optical interrogator comprises at least one optical source coupled to one end of the fiber to apply at least one optical pulse, which when reflected at a respective grating site conveys the feature indicative of the value of the respective local parameter at the respective grating site, and which when passing through the respective fiber portion which extends between said at least two grating sites conveys the respective optical backscatter portions for measurement of the optical change indicative of the respective distributed parameter in the fiber portion between the at least two grating sites.

6. The apparatus of claim 5, wherein the optical source comprises a source of narrow-band, swept-wavelength light over a predefined wavelength range.

7. The apparatus of claim 5, wherein the optical source comprises a source of broad-band light over the first wavelength range and further comprises a source of narrow-band light over the second wavelength range, wherein the second wavelength range comprises longer wavelengths relative to the first wavelength range.

8. The apparatus of claim 7, wherein the first wavelength range comprises light which when reflected at a respective grating site conveys the feature indicative of the value of the respective local parameter at the respective grating site.

9. The apparatus of claim 7, wherein the second wavelength range comprises light which when passing through the respective fiber portion which extends between said at least two sites conveys the respective optical backscatter portions for measurement of the optical change indicative of the respective distributed parameter in the fiber portion between the sites.

10. The apparatus of claim 7, wherein the first detection channel is configured in the first wavelength range to monitor the feature indicative of the value of a respective local parameter at one ore more respective grating sites.

11. The apparatus of claim 10, wherein the second detection channel is configured in the second wavelength range to combine the optical backscatter portions with or without an interferometer to sense the optical change indicative of the respective distributed parameter in the fiber portion between the sites.

12. The apparatus of claim 1, wherein the first and second detection channels are integrated in a common detection channel.

13. The apparatus of claim 1, wherein the second detection channel comprises an interferometer arranged to combine the optical backscatter portions, and further comprises a detector coupled to receive the combined optical backscatter portions from the interferometer.

14. The apparatus of claim 1, wherein the fiber comprises a plurality of fiber gratings distributed along a length of the fiber in respective groups, wherein the fiber gratings which constitute a respective group have respective non-overlapping wavelength optical responses relative to one another, wherein said non-overlapping optical responses can be simultaneously processed in a time domain to concurrently extract the respective distinguishing features indicative of respective values of one or more respective local parameters at the respective grating sites.

15. The apparatus of claim 14, wherein respective optical backscatter portions from adjacent pairs of fiber gratings in a respective group can be simultaneously processed in a time domain to concurrently determine respective optical changes in the respective fiber portions between adjacent pairs of fiber gratings indicative of respective values of one or more respective distributed parameters.

16. The apparatus of claim 1, wherein the respective optical backscatter portions comprise wavelengths which at least partially overlap.

17. A pipeline comprising an apparatus, wherein the apparatus comprises:
an optical fiber comprising:
at least two grating sites in the optical fiber comprising respective fiber gratings arranged to have respective optical responses in a first wavelength range comprising a distinguishing feature, wherein the distinguishing feature is indicative of a value of a respective local parameter at a respective grating site;
wherein the fiber gratings are further arranged to form, in combination with a respective portion of the optical fiber which extends between said at least two grating sites, respective optical backscatter portions that when combined with one another define another distinguishing feature in the optical response in a second wavelength range that is effective to sense an optical change in the fiber portion between the sites indicative of a value of a distributed parameter, wherein the distributed parameter comprises a parameter modality different from a parameter modality of respective local parameters at the respective grating sites, and wherein the optical responses from one or more grating sites of the at least two grating sites and optical responses from the respective optical backscatter portions of the one or more grating sites are simultaneously processed to contemporaneously obtain sensing information representative of the local parameters and distributed parameters;
an optical interrogator operatively coupled to the optical fiber, the optical interrogator comprising:
a first detection channel configured to monitor the distinguishing feature indicative of the value of the respective local parameter at the respective grating site wherein the first detection channel comprises:
a time division modulator arranged to relate one or more respective reflected pulses to one or more respective grating sites;
a spectrometer arranged to detect changes in the feature indicative of the value of a respective local parameter at a respective grating site; and
a second detection channel configured to combine the respective optical backscatter portions to sense the optical change in the respective fiber portion which extends between the two grating sites, wherein the optical change is indicative of the value of the distributed parameter.

18. An optical-based method for sensing parameters comprising:
providing an optical fiber;
arranging at least two grating sites in the optical fiber comprising respective fiber gratings arranged to have respective optical responses in a first wavelength range comprising a distinguishing feature, wherein the distinguishing feature is indicative of a value of a respective local parameter at a respective grating site;
configuring the two fiber gratings to form, in combination with a respective portion of the optical fiber which extends between said at least two sites, respective optical backscatter portions that when combined with one another with one another define another distinguishing feature in the optical response in a second wavelength range that is effective to sense an optical change in the fiber portion between the sites indicative of a value of a distributed parameter, wherein the distributed parameter comprises a parameter modality different from a parameter modality of respective local parameters at the respective grating sites, and wherein the optical responses from one or more grating sites of the at least two grating sites and optical responses from the respective optical backscatter portions of the one or more grating sites are simultaneously processed to contemporaneously obtain sensing information representative of the local parameters and distributed parameters;
monitoring the distinguishing feature indicative of the value of the respective local parameter at the respective grating site using a first detection channel of an optical interrogator wherein the first detection channel comprises:
a time division modulator arranged to relate one or more respective reflected pulses to one or more respective grating sites;
a spectrometer arranged to detect changes in the feature indicative of the value of a respective local parameter at a respective grating site; and
combining the optical backscatter portions to sense the optical change in the respective fiber portion which extends between the two grating sites indicative of the value of a distributed parameter using a second detection channel of the optical interrogator.

19. The method of claim 18, wherein configuring a respective fiber grating site comprises configuring a narrow-band response and a broad-band response at the respective fiber grating site.

20. The method of claim 19, wherein the configuring of the respective fiber grating site comprises illuminating a core of the fiber at the respective grating site with a pattern of ultraviolet light through a first mask configured to generate the narrow-band response, and further comprises illuminating the core of the fiber at the grating site with a pattern of ultraviolet light through a second mask configured to generate the broad-band response.

21. The method of claim 19, wherein the configuring of the respective fiber grating site comprises illuminating a core of the fiber at the grating site with a pattern of ultraviolet light through a mask comprising both the narrow-band response and the broad-band response.

22. The method of claim 19, wherein the configuring of the respective fiber grating site comprises writing on a core of the fiber at the grating site a narrow-band grating response, and applying a coating at the grating site arranged to increase backscatter.

23. The method of claim 18, wherein the distinguishing feature in the first wavelength range comprises a feature selected from the group consisting of a band edge, a lobe, a notch, a pattern.

24. The method of claim 18, wherein the respective local parameter at the respective grating site comprises a parameter selected from the group consisting of strain, temperature, and pressure.

25. The method of claim 18, wherein the respective distributed parameter comprises a parameter selected from the group consisting of dynamic strain, dynamic pressure and an acoustic signal.

* * * * *